(12) United States Patent
Wang et al.

(10) Patent No.: US 9,176,675 B1
(45) Date of Patent: Nov. 3, 2015

(54) FAST-ZEROING IN A FILE SYSTEM

(71) Applicant: EMC Corporation, Hopkinton, MA (US)

(72) Inventors: Wengang Wang, Beijing (CN); Yingchao Zhou, Beijing (CN); William K. McGrath, Wake Forest, NC (US); Jun Guo, Beijing (CN); Jia Zhai, Beijing (CN)

(73) Assignee: EMC Corporation, Hopkinton, MA (US)

( * ) Notice: Subject to any disclaimer, the term of this patent is extended or adjusted under 35 U.S.C. 154(b) by 125 days.

(21) Appl. No.: 14/098,271

(22) Filed: Dec. 5, 2013

(51) Int. Cl.
*G06F 12/02* (2006.01)
*G06F 3/06* (2006.01)
*G06F 12/10* (2006.01)

(52) U.S. Cl.
CPC ............ *G06F 3/0631* (2013.01); *G06F 3/0619* (2013.01); *G06F 3/0679* (2013.01); *G06F 12/109* (2013.01)

(58) Field of Classification Search
None
See application file for complete search history.

(56) References Cited

U.S. PATENT DOCUMENTS

2013/0275671 A1\* 10/2013 Domsch et al. ............... 711/114

\* cited by examiner

*Primary Examiner* — Duc Doan
(74) *Attorney, Agent, or Firm* — BainwoodHuang (57) ABSTRACT

A technique performs a host write operation on behalf of a host computer. The technique involves receiving a write request from the host computer, and providing a data write command and a zero write command to backend storage in response to the write request from the host computer. The backend storage maintains a file on behalf of the host computer. Additionally, the data write command includes host data to be written to the file. Furthermore, the zero write command defines a field of zeroes to be written to the file. The technique further involves sending an acknowledgement to the host computer, the acknowledgement serving as a response to the write request from the host computer.

20 Claims, 5 Drawing Sheets

FAST-ZEROING IN A FILE SYSTEM

BACKGROUND

Thin provisioning of a logical unit of storage (LUN) involves on-demand allocation of physical storage blocks to the LUN from a common pool of physical storage blocks. In contrast to traditional (or fat) LUN provisioning in which all of the physical storage is allocated to the LUN up front, thin provisioning allocates physical storage as needed. Accordingly, a thinly provisioned LUN typically appears larger (i.e., provides a larger available address space) than the amount of physical storage that actually has been allocated to that LUN.

In a conventional data storage system that uses 8 KB as a standard block size, suppose that a storage processor is tasked with writing 4 KB of host data from a host computer to a thinly provisioned LUN. First, the backend resources allocate an 8 KB physical block of storage to the thinly provisioned LUN from a pool of free physical storage blocks. Next, the storage processor forms a full block of data in memory by combining the 4 KB of host data and 4 KB of zeroes, and then writing the full block of data from the memory to the allocated 8 KB physical block. Such overwriting of the unused portion of the allocated 8 KB physical block with zeroes avoids any possibility of data leakage since the allocated 8 KB physical block may have been used previously to hold other host data, i.e., that 8 KB physical block may have been recycled.

SUMMARY

Unfortunately, there are deficiencies to the above-described conventional LUN thin provisioning approach. For example, the storage processor consumes bandwidth between the storage processor and the backend resources to write the zeroes to the backend resources. While this bandwidth is consumed, other resources may be blocked and prevented from performing useful work (e.g., other threads competing for the same bandwidth may be blocked from executing).

Additionally, the backend resources cannot distinguish between the real host data and the zeroes. That is, the backend resources treat the entire block as real host data. As a result, the same amount of backend resources is consumed regardless of how much real host data is actually being written to the allocated 8 KB physical block.

Furthermore, as the standard size of a physical block grows over time, the need to overwrite unused portions of blocks with zeroes will tend to increase. Accordingly, more and more bandwidth and backend resources will be used to overwrite unused portions of blocks with zeroes to prevent data leakage.

In contrast to the above-described conventional approach which consumes bandwidth writing zeroes to an unused portion of a block to prevent data leakage, improved techniques are directed to fast-zeroing in a file system. In particular, data storage circuitry performs a host write operation using a data write command to write actual host data to a block, and a zero write command to fill an unused portion of the block with zeroes. The zero write command does not require a body containing data, e.g., actual zeroes. Rather, the zero write command can be configured as a lightweight instruction without a body (e.g., an instruction to zero fill a region defined simply by an offset and a length). Accordingly, there is no bandwidth wasted on actual zeroes. Moreover, intelligent backend resources can be configured to track zero portions (e.g., based on detection of the zero write command) thus optimizing use of the backend resources rather than handle zeroes as real host data.

One embodiment is directed to a method of performing a host write operation on behalf of a host computer. The method includes receiving a write request from the host computer, and providing a data write command and a zero write command to backend storage in response to the write request from the host computer. The backend storage maintains a file on behalf of the host computer. Additionally, the data write command includes host data to be written to the file. Furthermore, the zero write command defines a field of zeroes to be written to the file. The method further includes sending an acknowledgement to the host computer, the acknowledgement serving as a response to the write request from the host computer.

In some arrangements, the host computer is constructed and arranged to access the file as a LUN. In these arrangements, processing circuitry manages the file via thin-provisioning, and the method further includes, in response to the write request and prior to providing the data write command and the zero write command to the backend storage, allocating a unit of storage to the file. The data write command is constructed and arranged to write the host data to one portion of the unit of storage allocated to the file, and the zero write command is constructed and arranged to write the field of zeroes to another portion of the unit of storage allocated to the file.

In some arrangements, the unit of storage allocated to the file is a block of storage. In these arrangements, providing the data write command and the zero write command to the backend storage includes (i) sending, as the data write command, a first write instruction defined by a first operation code to write the host data to a first region of the block, and (ii) sending, as the zero write command, a second write instruction defined by a second operation code to write the field of zeroes to a second region of the block. The first operation code is different than the second operation code. Additionally, the first region of the block is mutually exclusive and adjacent to the second region of the block. Furthermore, the host data and the field of zeroes exactly fill the block.

In some arrangements, the first write instruction includes (i) an object identifier which identifies the file among other files, (ii) the first operation code, (iii) a first offset value which identifies a starting point for the host data within the file, (iv) a first length value which identifies a length of the host data, and (v) the host data. In these arrangements, the second write instruction includes (i) the object identifier which identifies the file among the other files, (ii) the second operation code, (iii) a second offset value which identifies a starting point for the field of zeroes within the file, and (iv) a second length value which identifies a length of the field of zeroes.

In some arrangements, the first offset value is lower than the second offset value and identifies a beginning address of the block to locate the host data at a front of the block. In these arrangements, the second offset value identifies an address within the block to locate the field of zeroes after the host data and at a back of the block.

In some arrangements, providing the data write command and the zero write command to the backend storage includes (i) sending the zero write command to the backend storage and, after the zero write command has been sent to the backend storage, (ii) sending the data write command to the backend storage.

In some arrangements, providing the data write command and the zero write command to the backend storage further includes, after sending the zero write command to the backend storage and before sending the data write command to the backend storage, waiting for the backend storage to acknowledge processing of the zero write command to allow the backend storage to process the zero write command as a synchronous zero write operation.

In some arrangements, sending the acknowledgement to the host computer includes, after sending the data write command to the backend storage, waiting for the backend storage to acknowledge processing of the data write command. In these arrangements, sending the acknowledgement to the host computer further includes, after the backend storage has acknowledged processing of the data write command, providing the acknowledgement to the host computer to allow the backend storage to complete the host write operation as a synchronous host write operation.

In some arrangements, the processing circuitry includes (i) block-upper layer circuitry and (ii) filesystem layer circuitry. In these arrangements, the method further includes receiving, by the block-upper layer circuitry, block-based access requests from a set of host computers and conveying, by the block-upper layer circuitry, the block-based access requests to the filesystem layer circuitry.

In some arrangements, the method further includes receiving, by the filesystem layer circuitry, the block-based access requests from the block-upper layer circuitry and, performing, by the filesystem layer circuitry, filesystem access operations on the backend storage in response to the block-based access requests from the block-upper layer circuitry.

Another embodiment is directed to an electronic apparatus which includes memory, and control circuitry coupled to the memory. The memory stores instructions which, when carried out by the control circuitry, cause the control circuitry to:
  (i) receive a write request from a host computer,
  (ii) provide a data write command and a zero write command to backend storage in response to the write request from the host computer, the backend storage maintaining a file on behalf of the host computer, the data write command including host data to be written to the file, and the zero write command defining a field of zeroes to be written to the file, and
  (iii) send an acknowledgement to the host computer, the acknowledgement serving as a response to the write request from the host computer.

Yet another embodiment is directed to a computer program product having a non-transitory computer readable medium which stores a set of instructions to perform a host write operation on behalf of a host computer. The set of instructions, when carried out by computerized circuitry, cause the computerized circuitry to perform a method of:
  (i) receiving a write request from the host computer,
  (ii) providing a data write command and a zero write command to backend storage in response to the write request from the host computer, the backend storage maintaining a file on behalf of the host computer; the data write command including host data to be written to the file, and the zero write command defining a field of zeroes to be written to the file, and
  (iii) sending an acknowledgement to the host computer, the acknowledgement serving as a response to the write request from the host computer.

It should be understood that, in the cloud context, the above-mentioned electronic circuitry is formed by remote computer resources distributed over a network. Such a computing environment is capable of providing certain advantages such as enhanced fault tolerance, load balancing, processing flexibility, etc.

Other embodiments are directed to electronic systems and apparatus, processing circuits, computer program products, and so on. Some embodiments are directed to various methods, electronic components and circuitry which are involved in performing a host write operation.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to fast-zeroing in a file system. To this end, data storage circuitry performs a host write operation using a data write command to write actual host data to a block, and a zero write command to fill an unused portion of the block with zeroes. The zero write command does not require a body containing data, e.g., a body of actual zeroes. Rather, the zero write command can be configured as a lightweight instruction without a body (e.g., an instruction to zero fill a region defined simply by an offset and a length). Accordingly, there is no bandwidth wasted on actual zeroes. Moreover, intelligent backend resources can be configured to track zero portions (e.g., based on detection of the zero write command) thus optimizing use of the backend resources rather than being required to handle zeroes as real host data.

Figure 1:
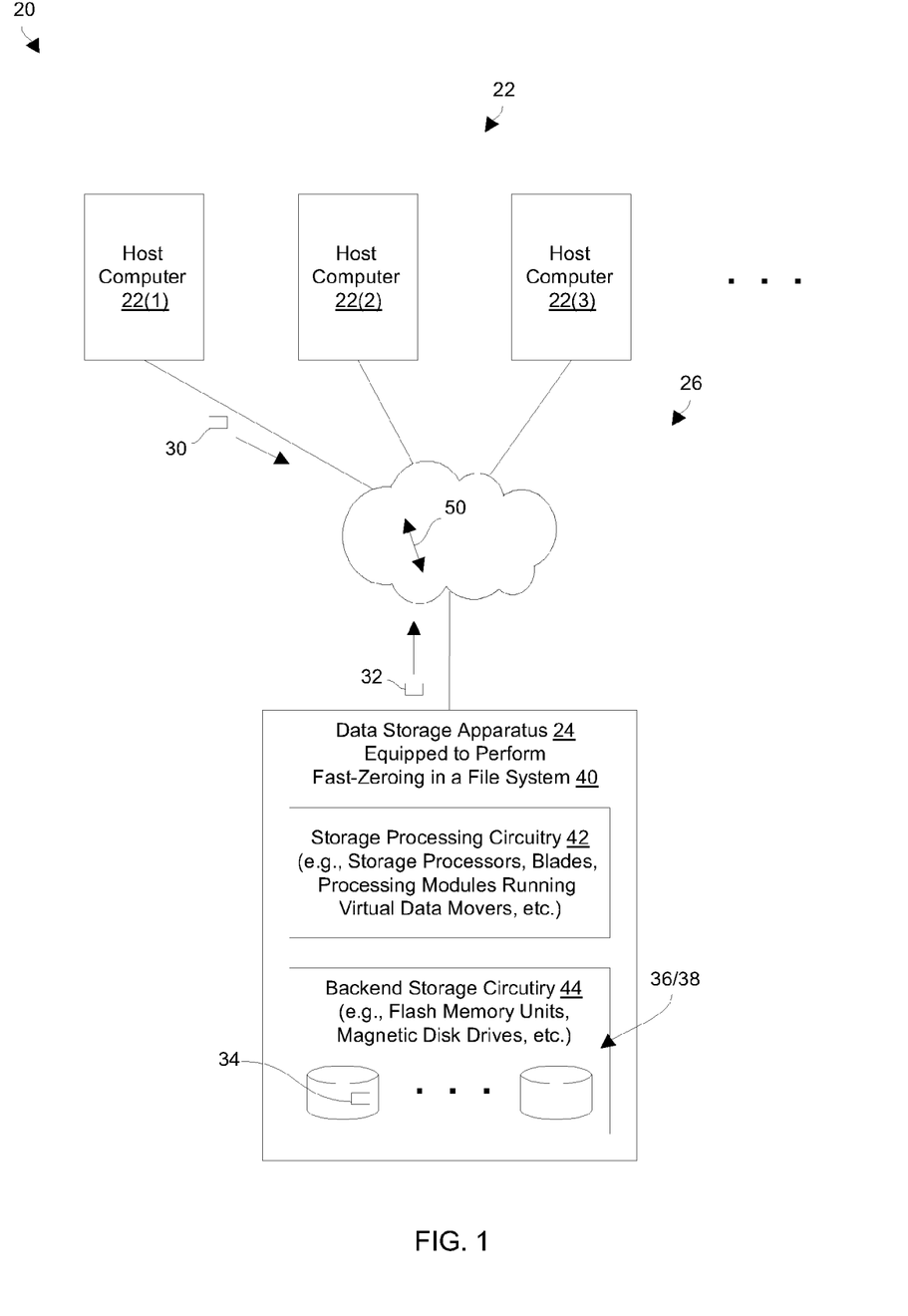
FIG. 1 is a block diagram of an electronic environment which is suitable for fast-zeroing in a file system.

FIG. 1 shows an electronic environment 20 which is suitable for fast-zeroing in a file system. The electronic environment 20 includes host computers 22(1), 22(2), 22(3), . . . (collectively, host computers 22), a data storage apparatus 24, and a communications medium 26.

Each host computer 22 is constructed and arranged to (i) provide host input/output (I/O) requests 30 to the data storage apparatus 24 and (ii) receive host I/O responses 32 from the data storage apparatus 24 through the communications medium 26 (e.g., see host computer 22(1)). Such host I/O requests 30 include requests to write host data 34 to the data storage apparatus 24, and read the host data 34 from the data storage apparatus 24.

The data storage apparatus 24 performs data storage operations on behalf of the host computers 22. As will be explained in further detail shortly, the data storage apparatus 24 manages logical units of storage (LUNs) 36 on behalf of the host computers 22. The data storage apparatus 24 is capable of treating each LUN 36 as a file 38 of a file system 40 (e.g., where storage locations of the LUN 36 map to other locations within the file 38). Additionally, while the data storage apparatus 24 performs the data storage operations in response to the host I/O requests 30, the data storage apparatus 24 is equipped to perform fast-zeroing of an area of storage.

As shown in FIG. 1, the data storage apparatus 24 includes storage processing circuitry 42 and backend storage circuitry 44 coupled to the storage processing circuitry 42. The storage processing circuitry 42 performs the data storage operations. Suitable form factors for the storage processing circuitry 42 include physical storage processors (SPs), blades, processing modules running virtual data mover, other array control circuitry, and so on. The backend storage circuitry 44 provides the actual storage (e.g., flash memory units, magnetic disk drives, other non-volatile storage devices and persistent storage mechanisms, combinations thereof, etc.).

The communications medium 26 is constructed and arranged to connect the various components of the electronic environment 20 together to enable these components to exchange electronic signals 50 (e.g., see the double arrow 50). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, cellular communications, combinations thereof, etc.

During operation, the data storage apparatus 24 performs data storage operations in response to host I/O requests 30. For example, the host computers 22 may send read requests to the data storage apparatus 24 to read host data 34 from the LUNs 36. Likewise, the host computers 22 may send write requests to the data storage apparatus 24 to write host data 34 to the LUNs 36.

When the storage processing circuitry 42 of the data storage apparatus 24 receives a write request to write host data 34 to a LUN 36, the storage processing circuitry 42 may need to allocate a block of storage from a common pool of free blocks maintained by the backend storage circuitry 44 to a file 38 of the file system 40 which serves as the LUN 36. In such a situation, if the storage processing circuitry 42 determines that the host data 34 to be written to the backend storage circuitry 34 is not a full block, the storage processing circuitry 42 provides, to the backend storage circuitry 44, (i) a data write command which includes the host data 34 to be written to the block and (ii) a zero write command which defines a field of zeroes to fill the remainder of the block. Such operation ensures that there is no inadvertent data leakage (i.e., no old host data 34 will accidentally remain in the block if the block had been used previously). Moreover, such operation consumes less bandwidth between the storage processing circuitry 42 and the backend storage circuitry 44 thus decreasing the likelihood of bottlenecking and blocking other resources. Furthermore, if the backend storage circuitry 44 is an intelligent array, the storage processing circuitry 42 and/or the backend storage circuitry 44 may be able to perform additional optimizations such as simply marking a zero address range rather than really writing out zeroes out to physical media and thus consume fewer storage resources. Further details will now be provided with reference to FIG. 2.

Figure 2:
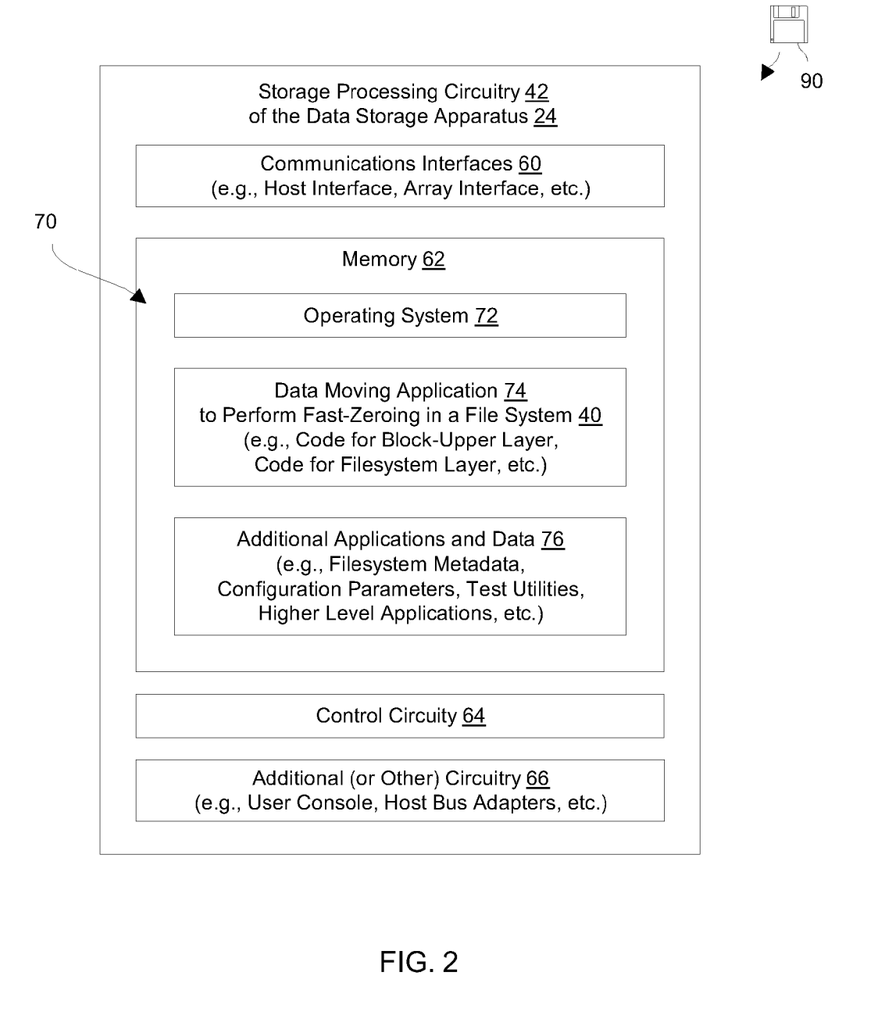
FIG. 2 is a block diagram of certain details of a data storage apparatus of the electronic environment of FIG. 1.

FIG. 2 shows particular details of the data storage apparatus 24. As shown, the storage processing circuitry 42 of the data storage apparatus 24 includes communications interfaces 60, memory 62, control circuitry 64, and additional (or other) circuitry 66.

The communications interfaces 60 are constructed and arranged to connect the storage processing circuitry 42 to various components of the electronic environment 20. In particular, the communications interfaces 60 include a set of host interfaces to connect to the communications medium 26 for host access. Additionally, the communications interfaces 64 include a set of array interfaces (e.g., host bus adapters) to connect to the backend storage circuitry 44. Other interfaces can be included as well such as a console port, a dedicated field service port, other network ports, and so on.

The memory 62 is intended to represent both volatile storage (e.g., DRAM, SRAM, etc.) and areas of non-volatile storage (e.g., flash memory, magnetic disk drives, etc.). The memory 62 stores a variety of software constructs 70 including an operating system 72 to manage resources of the storage processing circuitry 42, a data moving application 74 to enable the storage processing circuitry 42 to perform data storage operations (e.g., read operations, write operations, etc.), and additional applications and data 76 (e.g., metadata for one or more filesystems 40, configuration parameters, test utilities, higher level applications, and so on).

The control circuitry 64 is constructed and arranged to operate in accordance with the various software constructs 70 stored in the memory 62. Such circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software to the storage processing circuitry 42. The computer program product 90 has a non-transitory (or non-volatile) computer readable medium which stores a set of instructions which controls one or more operations of the storage processing circuitry 42. Examples of suitable computer readable storage media include tangible articles of manufacture and apparatus which store instructions in a non-volatile manner such as CD-ROM, flash memory, disk memory, tape memory, and the like.

The additional circuitry 66 is optional. For example, the additional circuitry 66 can include a user interface (or console terminal) to receive input from a user and provide output to the user, and so on. Further details will now be provided with reference to FIGS. 3 through 5.

Figure 3:
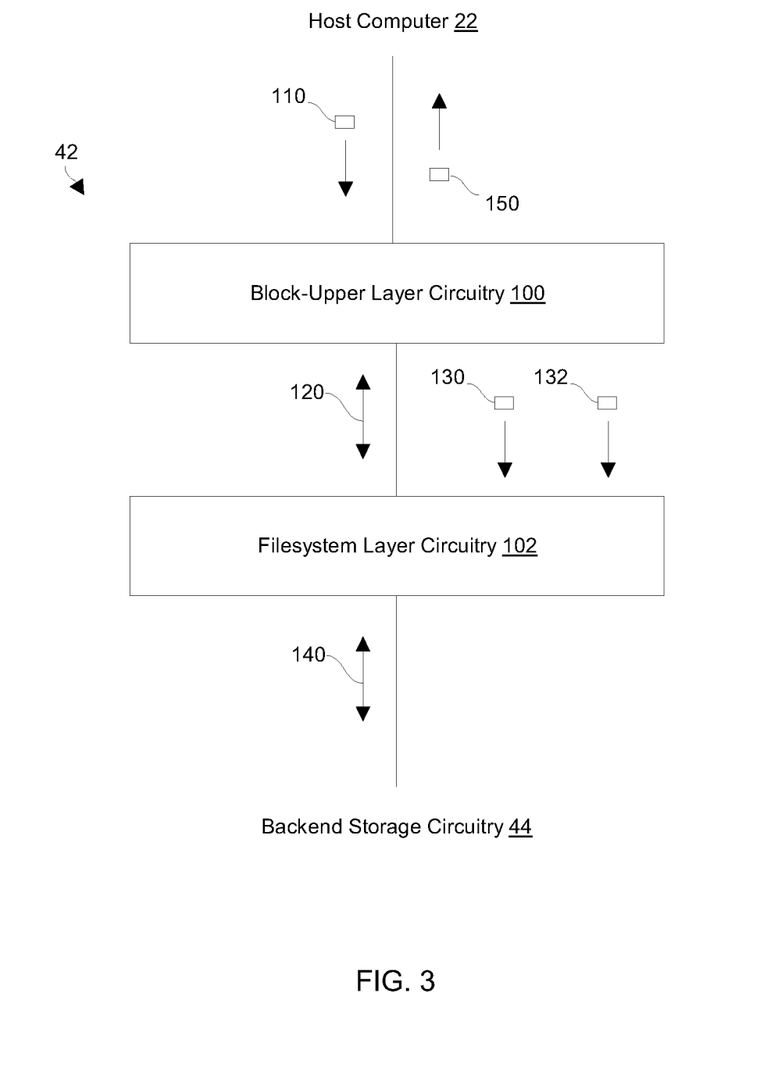
FIG. 3 is a block diagram showing particular details of the data storage apparatus of FIG. 2.
Figure 4:
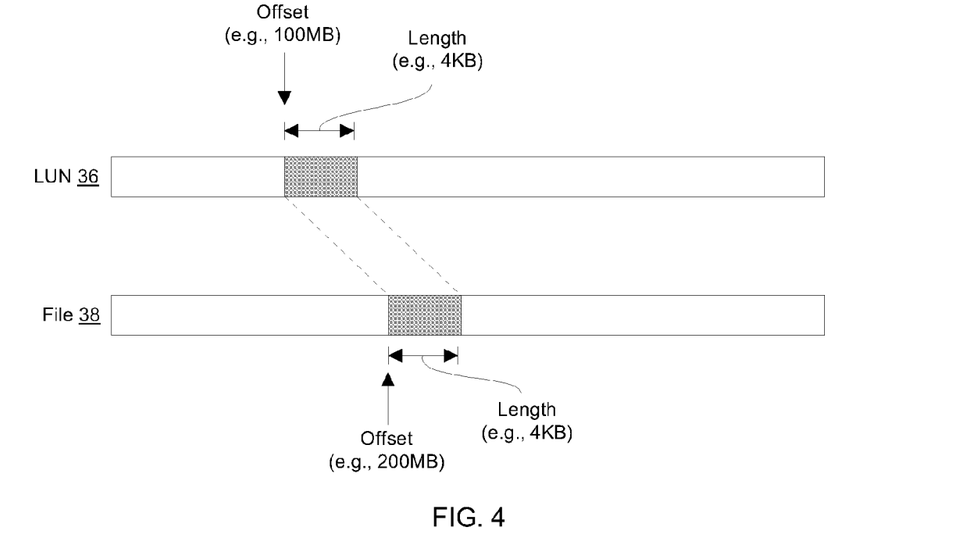
FIG. 4 is a block diagram of a file which is utilized by the data storage apparatus of FIG. 2 during a first operation time.
Figure 5:
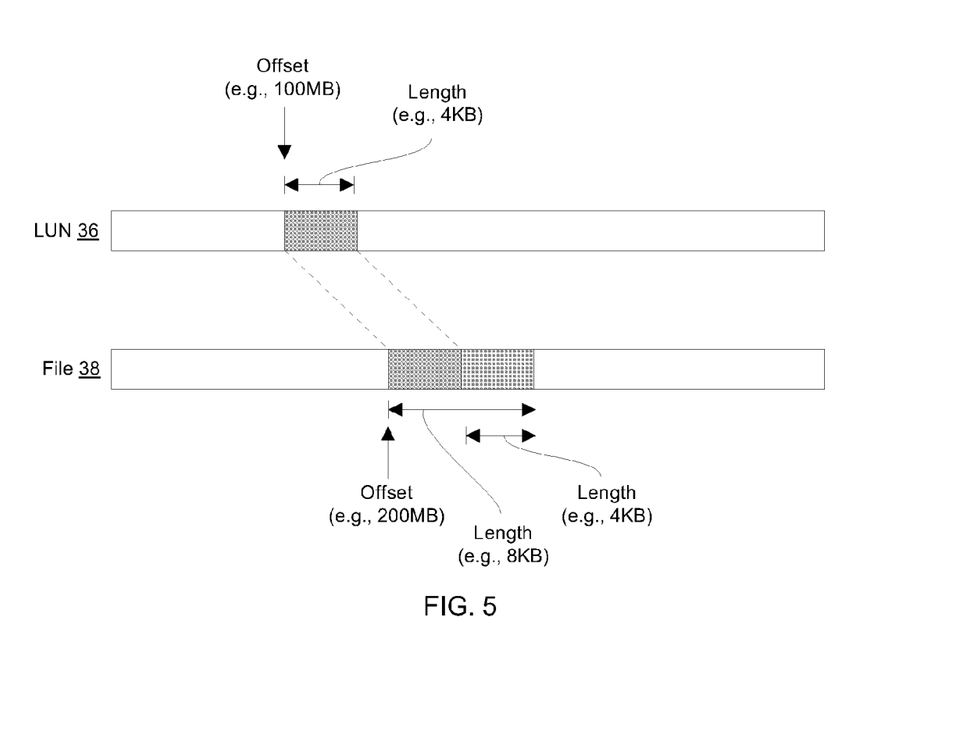
FIG. 5 is a block diagram of the file which is utilized by the data storage apparatus of FIG. 2 during a second operation time after the first operation time.

FIGS. 3 through 5 provide an example of fast-zeroing of a filesystem 40. FIG. 3 shows particular details of how the storage processing circuitry 42 performs a host write operation on behalf of a host computer 22 resulting in fast-zeroing of the filesystem 40. FIG. 4 shows particular LUN/file details during a first operation time. FIG. 5 shows particular LUN/file details during a second operation time which is after the first operation time.

As shown in FIG. 3, the storage processing circuitry 42 is partitioned into block-upper layer circuitry 100 and filesystem layer circuitry 102. In some arrangements, the block-upper layer circuitry 100 is formed when the control circuitry 64 runs in accordance with code for an block-upper layer, and the filesystem layer circuitry 102 is formed when the control circuitry 64 runs in accordance with code for a filesystem layer (also see the data moving application 74 in FIG. 2).

First, suppose that the host computer 22 sends a block-based write request 110 to the data storage apparatus 24 through the communications medium 26 (also see the host I/O request 30 in FIG. 1). In particular, suppose that a standard block size in the data storage apparatus 24 is 8 KB, and that the write request 110 includes 4 KB of new host data 34 to be stored starting at location 100 MB in a particular LUN 36 of the data storage apparatus 24.

As suitable format for the write request 110 is as follows:

| | |
|---|---|
| Header: | (a) ID (an identifier specifying the LUN 36 to access) |
| | (b) OP_TYPE (the operation type defining the write operation) |
| | (c) OFFSET (the offset where the new host data 34 starts) |
| | (d) LENGTH (the length of the new host data 34) |
| Body: | The new host data 34 itself. |

In this form, the OFFSET and LENGTH identify the storage region (e.g., a range [OFFSET, LENGTH]) for the new host data 34 within the LUN 36 (also see FIG. 4).

Upon receipt of the block-based write request 110 by the data storage apparatus 24, the block-upper layer 100 of the storage processing circuitry 42 determines that the write request 110 is a write operation to a thinly-provisioned LUN 36 (e.g., based on the ID and OP_TYPE parameters). Additionally, the block-upper layer 100 finds that there is 4 KB of new host data 34 to store in the LUN 36 (e.g., based on the OFFSET and LENGTH parameters), and maps this region to another region in the file 38. FIG. 4 shows by way of example that the region for the new host data 34 in the LUN 36 corresponds to a range [100 MB, 4 KB], and that the region for the new host data 34 in the file 38 corresponds to a range [200 MB, 4 KB].

As illustrated by the double arrow 120 in FIG. 3, the block-upper layer 100 then communicates with the filesystem layer 102 to coordinate completion of the write operation. In particular, the block-upper layer 100 communicates the details of the operation to the filesystem layer 102, and the filesystem layer 102 determines that there is currently no allocated storage for the new host data 34. Accordingly, the filesystem layer 102 allocates a new 8 KB block of storage to the file 38 to hold the new host data 34. That is, the filesystem layer 102 allocates an 8 KB block for storage at file offset 200 MB from a common pool of free blocks where previously used blocks can be recycled back to the pool. Such allocation may involve standard assignment of a storage block to the file 38, and updating of the file's inode structure and/or related metadata.

With the filesystem layer 102 now having storage in place to receive the new host data 34, the block-upper layer 100 provides a data write command 130 and a zero write command 132 to the filesystem layer 102. The data write command 130 includes the new host data 34 to be written to the file 38, and the zero write command 132 defines a field of zeroes to be written to the file 38.

As suitable format for the data write command 130 is as follows:
Header: (a) ID (an identifier specifying the LUN or device to access)
(b) OP_TYPE (the operation type defining a data write operation)
(c) OFFSET (the offset where the new host data 34 starts)
(d) LENGTH (the length of the new host data 34)
Body: The new host data 34 itself.

| | |
|---|---|
| Header: | (a) ID (an identifier specifying the LUN or device to access) |
| | (b) OP_TYPE (the operation type defining a data write operation) |
| | (c) OFFSET (the offset where the new host data 34 starts) |
| | (d) LENGTH (the length of the new host data 34) |
| Body: | The new host data 34 itself. |

In this form, the OFFSET and LENGTH of the data write command 130 identify the region (e.g., a range [200 MB, 4 KB]) for the new host data 34 within the file 38 (also see FIG. 5).

Additionally, as suitable format for the zero write command 132 is as follows:

| | |
|---|---|
| Header: | (a) ID (an identifier specifying the LUN or device to access) |
| | (b) OP_TYPE (the operation type defining a zero write operation) |
| | (c) OFFSET (the offset where the field of zeroes starts) |
| | (d) LENGTH (the length of the field of zeroes) |

In this form, the OFFSET and LENGTH of the zero write command 132 identify the region (e.g., a range [200 MB+4 KB, 4 KB]) for the field of zeroes within the file 38 (also see FIG. 5). Furthermore, unlike a conventional "write same" command, there is no value or character that needs to be provided for the zero write command 132.

It should be understood that, in some arrangements, the block-upper layer 100 sends the zero write command 132 to the filesystem layer 102 before sending the data write command 130. In response, the filesystem layer 102 completes a zero write operation starting at the correct file (or physical device) offset (i.e., 200 MB+4 KB) as a synchronous operation. The block-upper layer 100 is then informed of the correct file offset and provides the data write command 130 to write the new host data 34. The filesystem layer 102 then informs the block-upper layer 100 that the data write command 130 is processed.

The communications between the filesystem layer circuitry 102 and the backend storage circuitry 44 are illustrated by the double arrow 140 in FIG. 3. It should be understood that some data storage architectures may include additional I/O stack layers (e.g., replication, FAST cache, Flare LUN, RAID, etc.) that are omitted from FIG. 3 for simplicity. Nevertheless, it should be appreciated that such layers exist and that such layers may be involved in the write operation process.

Once the data write command 130 and the zero write command 132 have been processed, the block-upper layer 100 sends an acknowledgement 150 to the host computer 22. The acknowledgement 150 informs the host computer 22 that the write operation is complete (FIG. 3). Accordingly, the write operation appears to the host computer 22 as an atomic operation even though the write request 110 is converted into the data write command 130 and the zero write command 132 which is processed separately by the filesystem layer circuitry 102.

At this point, it should be understood that, since the zero write command 132 does not require a body containing actual zeroes, there is less bandwidth consumed vis-à-vis a conventional write command that includes a full block of data containing real host data and a field of actual zeroes. As a result, there is no bandwidth wasted on actual zeroes and there is no unnecessary bottlenecking or blocking of resources. Moreover, intelligent backend resources can be configured to track zero portions (e.g., based on detection of the zero write command) thus optimizing use of the backend resources rather than forcing the backend resources to handle zeroes as real host data.

In some arrangements, each of the data write command 130 and the zero write command 132 is processed as a synchronous operation. In some arrangements, the pair of the data write command 130 and the zero write command 132 is processed as a synchronous operation to preserve integrity of the storage block. Further details will now be provided with reference to FIG. 6.

Figure 6:
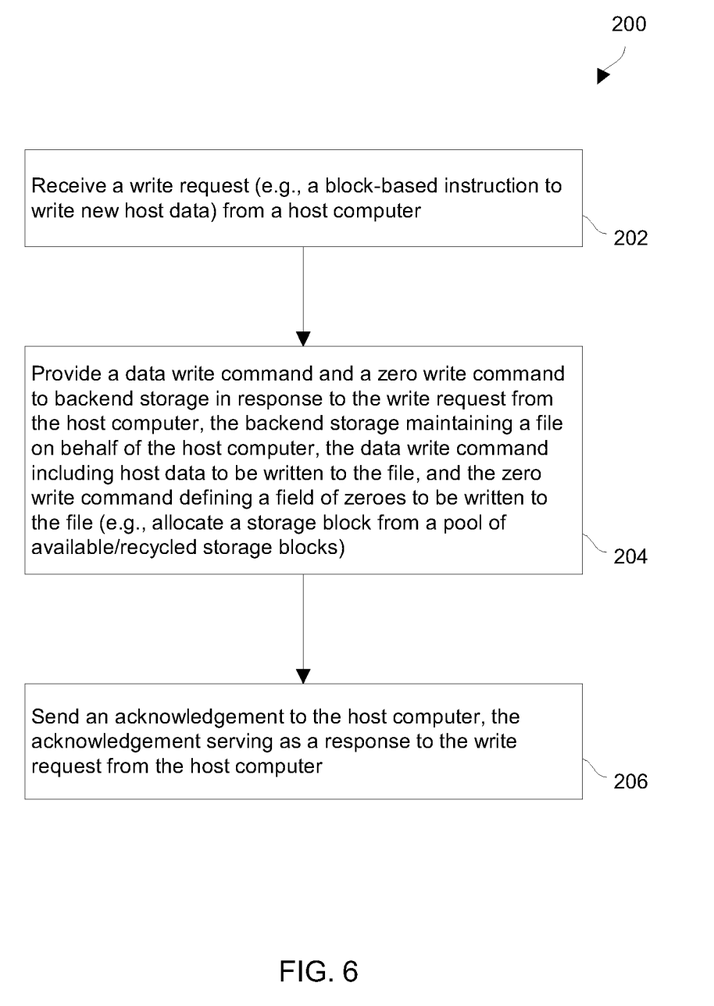
FIG. 6 is a block diagram of a flowchart of a procedure which is performed by the data storage apparatus of FIG. 2.

FIG. 6 shows a flowchart of a procedure 200 which is carried out by the data storage apparatus 24 when performing a host write operation on behalf of a host computer 22. At 202, the data storage apparatus 24 receives a write request from the host computer 22.

At 204, the data storage apparatus 24 provides a data write command and a zero write command to backend storage in response to the write request from the host computer. The backend storage maintains a file on behalf of the host computer. That is, the backend storage presents the file to the host computer as a thinly provisioned LUN and allocates blocks of storage to as needed. The data write command includes host data to be written to the file. The zero write command defines a field of zeroes to be written to the file. Such writing of zeroes prevents inadvertent data leakage from blocks that are reused from a common pool of free storage blocks (i.e., any old data is overwritten by a string of zeroes). Moreover, the zero write command does not include a body or payload of actual zeroes thus minimizing bandwidth consumption.

At 206, the data storage apparatus 24 sends an acknowledgement to the host computer. The acknowledgement serves as a response to the write request from the host computer.

As described above, improved techniques are directed to fast-zeroing in a file system. In particular, data storage circuitry performs a host write operation using a data write command 130 to write actual host data 34 to a block, and a zero write command 132 to fill an unused portion of the block with zeroes. The zero write command does not require a body containing data, e.g., actual zeroes. Rather, the zero write command 132 can be configured as a lightweight instruction without a body (e.g., an instruction to zero fill a region defined simply by an offset and a length). Accordingly, there is no bandwidth wasted on actual zeroes. Moreover, intelligent backend resources can be configured to track zero portions (e.g., based on detection of the zero write command 132) thus optimizing use of the backend resources rather than handle zeroes as real host data.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the zero write command 132 was above-described as overwriting the remaining unused section of a block to prevent inadvertent data leakage. The zero write command 132 is further capable of being used in other situations and applications. Along these lines, the zero write command 132 can be used to zero out a full storage block. Additionally, the zero write command 132 can be used to zero out a series of storage blocks. Such operations can be performed to initialize blocks/pages, to zero out blocks before returning them to the pool of free blocks, and so on.

Furthermore, it should be understood that the above-provided example of FIGS. 3 through 5 used a block size of 8 KB by way of example only. Other sizes are suitable for use as well. For example, suitable sizes for other allocation units include 512 bytes, 1 KB, 2 KB, 4 KB, 16 KB, and so on. Such modifications and enhancements are intended to belong to various embodiments of the disclosure.

What is claimed is:

1. A method of performing a host write operation on behalf of a host computer, the method comprising:
   receiving, by processing circuitry, a write request from the host computer;
   providing, by the processing circuitry, a data write command and a zero write command to backend storage in response to the write request from the host computer, the backend storage maintaining a file on behalf of the host computer; the data write command including host data to be written to the file, and the zero write command defining a field of zeroes to be written to the file; and
   sending, by the processing circuitry, an acknowledgement to the host computer, the acknowledgement serving as a response to the write request from the host computer.

2. A method as in claim 1 wherein the host computer is constructed and arranged to access the file as a logical unit of storage (LUN); wherein the processing circuitry manages the file via thin-provisioning; and wherein the method further comprises:
   in response to the write request and prior to providing the data write command and the zero write command to the backend storage, allocating a unit of storage to the file, the data write command being constructed and arranged to write the host data to one portion of the unit of storage allocated to the file, and the zero write command being constructed and arranged to write the field of zeroes to another portion of the unit of storage allocated to the file.

3. A method as in claim 2 wherein the unit of storage allocated to the file is a block of storage; and wherein providing the data write command and the zero write command to the backend storage includes:
   sending, as the data write command, a first write instruction defined by a first operation code to write the host data to a first region of the block, and
   sending, as the zero write command, a second write instruction defined by a second operation code to write the field of zeroes to a second region of the block, the first operation code being different than the second operation code, the first region of the block being mutually exclusive and adjacent to the second region of the block, and the host data and the field of zeroes exactly filling the block.

4. A method as in claim 3 wherein the first write instruction includes (i) an object identifier which identifies the file among other files, (ii) the first operation code, (iii) a first offset value which identifies a starting point for the host data within the file, (iv) a first length value which identifies a length of the host data, and (v) the host data; and
   wherein the second write instruction includes (i) the object identifier which identifies the file among the other files, (ii) the second operation code, (iii) a second offset value which identifies a starting point for the field of zeroes within the file, and (iv) a second length value which identifies a length of the field of zeroes.

5. A method as in claim 4 wherein the first offset value is lower than the second offset value and identifies a beginning address of the block to locate the host data at a front of the block, and wherein the second offset value identifies an address within the block to locate the field of zeroes after the host data and at a back of the block.

6. A method as in claim 2 wherein the unit of storage allocated to the file is a block of storage; and wherein providing the data write command and the zero write command to the backend storage includes:

sending the zero write command to the backend storage, and after the zero write command has been sent to the backend storage, sending the data write command to the backend storage.

7. A method as in claim 6 wherein providing the data write command and the zero write command to the backend storage further includes:

after sending the zero write command to the backend storage and before sending the data write command to the backend storage, waiting for the backend storage to acknowledge processing of the zero write command to allow the backend storage to process the zero write command as a synchronous zero write operation.

8. A method as in claim 7 wherein sending the acknowledgement to the host computer includes:

after sending the data write command to the backend storage, waiting for the backend storage to acknowledge processing of the data write command, and after the backend storage has acknowledged processing of the data write command, providing the acknowledgement to the host computer to allow the backend storage to complete the host write operation as a synchronous host write operation.

9. A method as in claim 2 wherein the processing circuitry includes (i) block-upper layer circuitry and (ii) filesystem layer circuitry; and wherein the method further comprises:

receiving, by the block-upper layer circuitry, block-based access requests from a set of host computers, and conveying, by the block-upper layer circuitry, the block-based access requests to the filesystem layer circuitry.

10. A method as in claim 9, further comprising:

receiving, by the filesystem layer circuitry, the block-based access requests from the block-upper layer circuitry, and performing, by the filesystem layer circuitry, filesystem access operations on the backend storage in response to the block-based access requests from the block-upper layer circuitry.

11. An electronic apparatus, comprising:

memory; and control circuitry coupled to the memory, the memory storing instructions which, when carried out by the control circuitry, cause the control circuitry to:

receive a write request from a host computer, provide a data write command and a zero write command to backend storage in response to the write request from the host computer, the backend storage maintaining a file on behalf of the host computer, the data write command including host data to be written to the file, and the zero write command defining a field of zeroes to be written to the file, and send an acknowledgement to the host computer, the acknowledgement serving as a response to the write request from the host computer.

12. An electronic apparatus as in claim 11 wherein the host computer is constructed and arranged to access the file as a logical unit of storage (LUN); wherein the control circuitry manages the file via thin-provisioning; and wherein the control circuitry is further constructed and arranged to:

in response to the write request and prior to providing the data write command and the zero write command to the backend storage, allocate a unit of storage to the file, the data write command writing the host data to one portion of the unit of storage allocated to the file, and the zero write command writing the field of zeroes to another portion of the unit of storage allocated to the file.

13. An electronic apparatus as in claim 12 wherein the unit of storage allocated to the file is a block of storage; and wherein the control circuitry, when providing the data write command and the zero write command to the backend storage, is constructed and arranged to:

send, as the data write command, a first write instruction defined by a first operation code to write the host data to a first region of the block, and send, as the zero write command, a second write instruction defined by a second operation code to write the field of zeroes to a second region of the block, the first operation code being different than the second operation code, the first region of the block being mutually exclusive and adjacent to the second region of the block, and the host data and the field of zeroes exactly filling the block.

14. An electronic apparatus as in claim 13 wherein the first write instruction includes (i) an object identifier which identifies the file among other files, (ii) the first operation code, (iii) a first offset value which identifies a starting point for the host data within the file, (iv) a first length value which identifies a length of the host data, and (v) the host data;

wherein the second write instruction includes (i) the object identifier which identifies the file among the other files, (ii) the second operation code, (iii) a second offset value which identifies a starting point for the field of zeroes within the file, and (iv) a second length value which identifies a length of the field of zeroes;

wherein the first offset value is lower than the second offset value and identifies a beginning address of the block to locate the host data at a front of the block; and wherein the second offset value identifies an address within the block to locate the field of zeroes after the host data and at a back of the block.

15. An electronic apparatus as in claim 14 wherein the control circuitry includes (i) block-upper layer circuitry and (ii) filesystem layer circuitry;

wherein the block-upper layer circuitry is constructed and arranged to receive block-based access requests from a set of host computers, and convey the block-based access requests to the filesystem layer circuitry; and wherein the filesystem layer circuitry is constructed and arranged to receive the block-based access requests from the block-upper layer circuitry, and perform filesystem access operations on the backend storage in response to the block-based access requests from the block-upper layer circuitry.

16. A computer program product having a non-transitory computer readable medium which stores a set of instructions to perform a host write operation on behalf of a host computer, the set of instructions, when carried out by computerized circuitry, causing the computerized circuitry to perform a method of:

receiving a write request from the host computer;

providing a data write command and a zero write command to backend storage in response to the write request from the host computer, the backend storage maintaining a file on behalf of the host computer; the data write command including host data to be written to the file, and the zero write command defining a field of zeroes to be written to the file; and sending an acknowledgement to the host computer, the acknowledgement serving as a response to the write request from the host computer.

17. A computer program product as in claim 16 wherein the host computer is constructed and arranged to access the file as a logical unit of storage (LUN); wherein the computerized circuitry manages the file via thin-provisioning; and wherein the method further comprises:

in response to the write request and prior to providing the data write command and the zero write command to the backend storage, allocating a unit of storage to the file, the data write command being constructed and arranged to write the host data to one portion of the unit of storage allocated to the file, and the zero write command being constructed and arranged to write the field of zeroes to another portion of the unit of storage allocated to the file.

18. A computer program product as in claim 17 wherein the unit of storage allocated to the file is a block of storage; and wherein providing the data write command and the zero write command to the backend storage includes:

sending, as the data write command, a first write instruction defined by a first operation code to write the host data to a first region of the block, and sending, as the zero write command, a second write instruction defined by a second operation code to write the field of zeroes to a second region of the block, the first operation code being different than the second operation code, the first region of the block being mutually exclusive and adjacent to the second region of the block, and the host data and the field of zeroes exactly filling the block.

19. A computer program product as in claim 18 wherein the first write instruction includes (i) an object identifier which identifies the file among other files, (ii) the first operation code, (iii) a first offset value which identifies a starting point for the host data within the file, (iv) a first length value which identifies a length of the host data, and (v) the host data;

wherein the second write instruction includes (i) the object identifier which identifies the file among the other files, (ii) the second operation code, (iii) a second offset value which identifies a starting point for the field of zeroes within the file, and (iv) a second length value which identifies a length of the field of zeroes;

wherein the first offset value is lower than the second offset value and identifies a beginning address of the block to locate the host data at a front of the block; and wherein the second offset value identifies an address within the block to locate the field of zeroes after the host data and at a back of the block.

20. A computer program product as in claim 19 wherein providing the data write command and the zero write command to the backend storage includes:

sending the zero write command to the backend storage, and after the zero write command has been sent to the backend storage, sending the data write command to the backend storage.

* * * * *